United States Patent
Dameno et al.

(10) Patent No.: US 7,374,789 B2
(45) Date of Patent: May 20, 2008

(54) PROCESS FOR THE PREPARATION OF COOKED PASTA, IN PARTICULAR FOR THE PREPARATION OF READY-TO-EAT MEALS HAVING A LONG SHELF-LIFE

(75) Inventors: Franco Dameno, Parma (IT); Irene Buiat, Parma (IT); Oreste Caselli, Parma (IT); Nicola Mangiavacca, Parma (IT)

(73) Assignee: Barilla Alimentare S.p.A., Parma (IT)

( * ) Notice: Subject to any disclaimer, the term of this patent is extended or adjusted under 35 U.S.C. 154(b) by 658 days.

(21) Appl. No.: 10/374,352

(22) Filed: Feb. 25, 2003

(65) Prior Publication Data

US 2003/0190400 A1    Oct. 9, 2003

(30) Foreign Application Priority Data

Feb. 26, 2002   (EP)   ................... 02425101

(51) Int. Cl.
   *A23L 1/162*   (2006.01)
(52) U.S. Cl. ........................ 426/557; 426/451
(58) Field of Classification Search ........ 426/451, 426/289, 557
   See application file for complete search history.

(56) References Cited

U.S. PATENT DOCUMENTS 3,718,480 A * 2/1973 Tremblay et al. ........... 426/242
4,552,772 A   11/1985 Saitoh et al.
4,597,976 A   7/1986 Doster et al.
5,332,587 A   7/1994 Howard et al.
5,508,053 A * 4/1996 Villota et al. ............... 426/557
5,817,356 A * 10/1998 Gum et al. .................. 426/325

FOREIGN PATENT DOCUMENTS

| EP | 0 745 331 A2 | 12/1996 |
| EP | 0 947 143 A1 | 10/1999 |
| EP | 0 968 659 A1 | 1/2000 |
| JP | 402242650 A * | 9/1990 |
| JP | 406000064 A * | 1/1994 |
| JP | 406153838 A * | 6/1994 |

* cited by examiner

*Primary Examiner*—Lien Tran
(74) *Attorney, Agent, or Firm*—Akerman Senterfitt

(57) ABSTRACT

A method is disclosed in which fresh alimentary pasta is prepared from a starting dough that has been acidified with an edible acid. The pasta is then dried to a moisture content of about 11%, cooked in salted water, strained, rinsed, dipped in an aqueous solution of an edible acid to achieve a pH no more than 4.1, metered into suitable packages and subjected to sanitization.

12 Claims, No Drawings

PROCESS FOR THE PREPARATION OF COOKED PASTA, IN PARTICULAR FOR THE PREPARATION OF READY-TO-EAT MEALS HAVING A LONG SHELF-LIFE

FIELD OF APPLICATION

The present invention broadly relates to the technological field of the production of ready-to-eat food dishes based on pre-cooked alimentary pasta.

In particular, the invention relates to a method of producing cooked (or pre-cooked) alimentary pasta, wherein the pasta is processed with an edible acid, and thus referred to as "acidic pasta", and is useful to prepare ready-to-eat dishes featuring long shelf-life at both room and refrigerator temperatures.

PRIOR ART

It is recognised that many types of cooked alimentary pasta that currently enter the commercial production of ready-to-eat dishes are the outcome of research efforts directed to make, on industrial basis, alimentary pasta for direct consumption which, on the one side, would have good organoleptic and quality characteristics, and on the other, could be preserved at room and refrigerator temperatures for long periods.

These efforts yielded for the most part techniques of producing alimentary cooked pasta, which include processing with an edible acid to reduce the pH of cooked pasta for substantially preventing the bacterial growth, since the high moisture content of cooked pasta provides good foundation for bacteria growth. It is on account of the added acid that cooked pasta so prepared has come to be commonly termed "acidic pasta".

One method of producing acidic pasta as above comprises adding an edible acid to the starting dough, shaping the newly made pasta (moisture content of 30 to 32%), and then cooking in water the pasta in the shape given to it. This method is described in U.S. Pat. No. 4,597,976, for example.

More particularly, U.S. Pat. No. 4,597,976 discloses a method of preparing ready-to-eat dishes of pre-cooked acidic pasta that also include flowing-state sauce. In this method, each component of the dish is processed with an edible acid so as to have a balanced pH of less than 4.6.

The pasta is obtained from a dough comprising flour, gluten, powder eggs, and an acid for alimentary use. The newly made pasta is then boiled in water, rinsed, strained, and steamed for 5 minutes at a temperature of at least 85° C. The cooked acidic pasta thus obtained is packaged in metered amounts, a sauce with a pH below 4.6 is added into the packages, and the packages are sealed and sterilized.

Such methods have two drawbacks:

the presence of acid in the starting dough, as well as in the newly made pasta, causes a substantial destructuration of the protein and starch matrix such that, after boiling in water, a cooked pasta having low organoleptic properties is obtained, in particular a cooked pasta having low consistency or even an overcooked texture; and cooking in water causes acidic pasta to gradually lose the acid added to the starting dough, consequently cooked pasta has an acidity low enough to impair its preservability.

According to another known method of producing cooked pasta, no acid is added in the dough, and the pasta formed from the dough is cooked in water additivated with an acid.

This method has a serious drawback in that the distribution of the alimentary acid is not uniform throughout the structure of cooked pasta, but rather acidification is only adequate at the surface of cooked pasta.

Therefore, cooked acidic pasta prepared by the above method has a definitely shorter shelf-life.

The technical problem underlying the present invention is to provide a method of producing cooked acidic pasta, suitable for direct consumption or inclusion in ready-to-eat dishes, which has good organoleptic and textural characteristics and long shelf-life, thereby overcoming the aforementioned drawbacks of the prior art.

SUMMARY OF THE INVENTION

The technical problem is solved by a method of producing cooked acidic alimentary pasta comprising the steps of:

preparing an alimentary dough comprising semolina, water and at least one edible acid;

forming said alimentary dough obtaining fresh acidic pasta having a pH of 3.8 to 4.3 and a moisture content of 30 to 32%;

drying said fresh acidic pasta to a moisture content of 11.0 to 12.5%;

substantially completely cooking said dried pasta obtaining cooked acidic pasta;

treating said cooked acidic pasta with an aqueous solution of an alimentary acid to obtain cooked acidic pasta having a pH not more than 4.1; and packaging said cooked acidic pasta and subjecting the packaged pasta to thermal sanitization.

The advantages of this invention accrue from that by applying the acid in two steps (to the starting dough and the cooked pasta) separated by a drying step, a cooked acidic pasta is obtained which achieves excellent organoleptic and textural characteristics, fully comparable to those of traditional freshly cooked pasta, and this even at the end of long storage periods at room or refrigerator temperatures.

In particular, it is believed that acidification of the dough causes an optimal and uniform distribution of the edible acid down to the core of the fresh pasta prepared from it; that the intervening drying step, causing the gluten contained in the fresh pasta to reticulate, is effective to eliminate any destructurating effect of the acid on the structure of said fresh pasta; and that the second acidifying step carried out on the cooked pasta restores it to desired acidity values, which the cooking process is likely to have altered somewhat.

The starting dough may be any dough based on semolina and water, and comprising a standard edible acid for use in alimentary acidic pasta.

Preferably, gluten is added to the dough ingredients in amounts of 4 to 10% by weight on the dough weight, the preferred amount being 9%.

Gluten enhances the protein content of pasta and makes for a firmer and more consistent end product. Preferably, the moisture content of the dough is in the range of 30 to 40%.

The edible acid may be any organic or inorganic acid that is suitable for food applications and substantially soluble in water. Preferably, the edible acid is selected from a group comprising citric acid, fumaric acid, lactic acid, maleic acid, tartaric acid, sulphuric acid, hydrochloric acid, glucone-delta-lactone acid, and phosphoric acids. The preferred acid is glucone-delta-lactone acid.

The edible acid is added into the dough in varying amounts between 0,8 and 1.5% by weight on dough weight, 1% being the preferred amount.

The alimentary dough is formed conventionally.

The pasta is dried conventionally through conventional driers to yield dried pasta with a relative moisture content of up to 12.5%, preferably of 11 to 11.5%.

The alimentary pasta may be cooked in hot or boiling water in a substantial complete way for the time required to achieve desired characteristics, especially as regards firmness and consistency, depending on end users' preferences and demands.

Preferably, the pasta is cooked as required to achieve a so-called "al dente" cooking. Pasta is said to be cooked "al dente" when it is soft at the surface and firm inside. The moisture content of such pasta would usually lie between 53 and 63%, and the pasta itself shows firmness, consistency or texture, stickiness and accumulation/suppleness properties on the plate which are most appreciated by the consumer.

Preferably, the acidic pasta is rinsed with water on completion of the cooking step and before it goes through the second acidifying step.

Acidification is applied preferably by dipping the cooked acidic pasta into an aqueous solution of the alimentary acid of choice for a predetermined time to yield cooked acidic pasta having a pH no higher than 4.1, preferably in the range of 3.8 to 4.3.

Preferably, the pH of the aqueous solution should be 2.2 to 2.8.

Advantageously, the acidifying process of the cooked acidic pasta should be carried out at moderate temperatures of 18° to 25° C., preferably at room temperature, so as to retain the good organoleptic and textural characteristics of the cooked acidic pasta.

Following the acidifying process, the cooked acidic pasta is dried and loaded into packages, generally trays, in metered amounts. The package would be a gas-impermeable sealed type suitable for vacuum packaging or packaging under modified atmosphere.

Before packaging, the cooked acidic pasta may be additivated with an alimentary oil to attenuate the natural stickiness of pasta.

The modification of the atmosphere inside the package may be carried out by applying vacuum and optionally introducing into the package an inert gas such as nitrogen or carbon dioxide.

The packaged pasta must be subjected to sanitization for adequate preservation. This is done by subjecting the cooked pasta sealed into packages to a pasteurization and/or sterilization process known per se. For example, the packages containing cooked pasta can be pasteurized at a temperature of 80° to 90° C., by heating with steam or dipping in boiling water. A preferred method of pasteurizing or sterilizing cooked pasta includes exposure to microwave The cooked acidic pasta obtained with the method of this invention has excellent organoleptic and textural characteristics that are fully comparable to those of traditional freshly cooked pasta. It can be consumed as such or can be further treated as desired before consumption. For example, before consumption cooked acidic pasta obtained with the method of this invention may be heated or fried with or without condiment added, while substantially maintaining its original characteristics.

In addition, the shelf-life of this pasta is made quite long because the alimentary acid is distributed uniformly through its structure, as a result of the acidification being carried out on the dough, and because the acidification treatment after the cooking step ensures a correct acidity or pH to the cooked pasta end product.

Cooked pasta obtained with the method of the invention may be well preserved for no less than 8 to 12 months at room temperature, or even longer if it is preserved at refrigerator temperature.

The features and advantages of this invention will be further illustrated by a non-limitative example of the inventive method.

EXAMPLE

A dough for alimentary pasta was prepared by mixing together the following ingredients, in percent by weight on the dough weight: 45% semolina of durum fine flour, 46% water, 9% gluten, and an aqueous solution of glucone-delta-lactone acid having a pH of 2.8 in a preset amount to attain a pH of 3.9 for the dough.

The kneaded dough had a moisture content of 32%, and was extruded conventionally into conventional spaghettis. The resulting fresh spaghettis were dried conventionally to bring their moisture content down to no more than 11,5%.

The dried spaghettis were cooked "al dente" for 12 minutes in plenty salted water, and then strained and rinsed with cold water.

The cooked acidic spaghettis, which had a moisture content of 60%, were dipped in an aqueous solution of glucone-δ-lactone acid having pH 2.2 and a temperature of 22° C. for 1-3 minutes At the end of the treatment with acid, the cooked spaghettis had a pH of 4, as measured by conventional analytical methods.

The cooked acidic spaghetti were taken out of the acid solution, dried, and metered in 200 g amounts into suitable trays for food packaging. A preset amount of olive oil was added to each trayful of cooked acidic spaghettis.

Each trayful of oil-added cooked acidic spaghettis was then sealed in its packaging tray once the atmosphere inside the tray had been modified by removing air and substituting it with nitrogen. The sealed trays containing cooked acidic spaghettis were then pasteurized by microwave treatment.

The bacterial growth on samples of the spaghettis packaged into the trays was monitored at regular intervals counting from packaging time, through conventional microbiological analysis procedures. The results of these microbiological analyses showed that bacterial growth on the samples tested has been inhibited over the period of 12 months from packaging, and demonstrated a remarkable decrease in average bacterial population. Beyond 12 months after packaging, a slight progressive increase in bacterial population was noticeable which led to eventual decay of the product.

The above samples of spaghettis were tested for compressive strength on an INSTRON instrument at regular intervals after packaging.

The results of these tests showed that the compressive strength of the samples of cooked spaghettis was substantially unchanged up to 8 months from packaging, and after 12 months from packaging, the average value was found to be just 5% lower than the value measured before packaging.

We claim:

1. A method of producing cooked alimentary pasta comprising the steps of:
   preparing an alimentary dough comprising semolina, and water;
   acidifying the alimentary dough during preparation in a first acidifying step by adding at least one edible acid thereto;

forming said alimentary dough to obtain fresh acidic pasta having a pH of 3.8 to 4.3 and a moisture content of 30 to 32% and in which said edible acid is distributed to the fresh alimentary core;

drying said fresh acidic pasta to a moisture content of 11.0 to 12.5% prior to cooking said pasta, allowing gluten contained in the fresh acidic pasta to reticulate;

substantially completely cooking said dried pasta to obtain cooked pasta;

treating said cooked pasta in a second acidifying step with an aqueous solution of an alimentary acid to obtain cooked acidic pasta having a pH not more than 4.1; and packaging said cooked acidic pasta for distribution in sealed packages and subjecting the packaged pasta to thermal sanitization by heating the sealed packages.

2. A method according to claim 1, wherein said alimentary dough contains gluten in amounts from 4 to 10% by weight on the dough weight.

3. A method according to claim 1, wherein said edible acid is provided in the dough in amounts of 0.8 to 1.5% by weight on the dough weight.

4. A method according to claim 3, wherein said edible acid is selected from the group consisting of citric acid, fumaric acid, lactic acid, maleic acid, tartaric acid, sulphuric acid, hydrochloric acid, glucone-delta-lactone acid, and phosphoric acids.

5. A method according to claim 4, wherein said edible acid is glucone-delta-lactone acid.

6. A method according to claim 1, wherein said cooked acidic alimentary pasta has a moisture content of 53 to 62%.

7. A method according to claim 1, wherein said step of acid-treating the cooked alimentary pasta is carried out by dipping the cooked acidic alimentary pasta into said aqueous solution of the edible acid for 60 to 180 seconds.

8. A method according to claim 7, wherein the pH of said aqueous solution of the edible acid is 2.2 to 2.8.

9. A method according to claim 1, wherein the pH of said cooked acidic pasta is 3.8 to 4.1.

10. A method according to claim 1, wherein said cooked acidic alimentary pasta is vacuum packaged or packaged under a modified atmosphere.

11. A method according to claim 2, wherein said alimentary dough contains gluten in an amount of 9% by weight on the dough weight.

12. A method according to claim 3, wherein said edible acid is provided in the dough in an amount of 1% by weight on the dough weight.

* * * * *